(12) United States Patent
Hirata et al.

(10) Patent No.: US 8,021,794 B2
(45) Date of Patent: Sep. 20, 2011

(54) FUEL CELL WITH CROSS-SHAPED REFORMER

(75) Inventors: Katsuya Hirata, Ibaraki (JP); Taner Akbay, Ibaraki (JP); Takashi Miyazawa, Ibaraki (JP); Naoya Murakami, Ibaraki (JP)

(73) Assignees: Mitsubishi Materials Corporation, Tokyo (JP); The Kansai Electric Power Co., Inc., Osaka (JP)

( * ) Notice: Subject to any disclaimer, the term of this patent is extended or adjusted under 35 U.S.C. 154(b) by 668 days.

(21) Appl. No.: 12/096,336

(22) PCT Filed: Dec. 4, 2006

(86) PCT No.: PCT/JP2006/324177
§ 371 (c)(1),
(2), (4) Date: Jun. 5, 2008

(87) PCT Pub. No.: WO2007/066618
PCT Pub. Date: Jun. 14, 2007

(65) Prior Publication Data
US 2009/0233130 A1 Sep. 17, 2009

(30) Foreign Application Priority Data
Dec. 5, 2005 (JP) .................. 2005-350414

(51) Int. Cl.
*H01M 8/06* (2006.01)
*H01M 8/04* (2006.01)
*H01M 8/10* (2006.01)

(52) U.S. Cl. ........ 429/423; 429/416; 429/434; 429/435; 429/479; 429/495

(58) Field of Classification Search .................. 429/416, 429/420, 423, 452, 434, 435, 479, 495; 48/197 R
See application file for complete search history.

(56) References Cited

U.S. PATENT DOCUMENTS

| 4,877,693 A | 10/1989 | Baker |
| 4,983,471 A | 1/1991 | Reichner et al. |
| 5,079,105 A * | 1/1992 | Bossel .......................... 429/455 |
| 5,725,964 A | 3/1998 | Huppmann |
| 2004/0146763 A1 | 7/2004 | Pondo et al. |

(Continued)

FOREIGN PATENT DOCUMENTS

DE 198 12 155 9/1999

(Continued)

OTHER PUBLICATIONS

Supplementary European Search Report issued Mar. 5, 2009 in the Application No. EP 06 83 3934.

(Continued)

*Primary Examiner* — Patrick Ryan
*Assistant Examiner* — Julian Anthony
(74) *Attorney, Agent, or Firm* — Wenderoth, Lind & Ponack, L.L.P.

(57) ABSTRACT

A fuel cell has a high heat recovery efficiency for effectively collecting heat discharged from a fuel cell stack. The fuel cell includes a power generating cell and a separator which are alternately laminated to constitute a fuel cell stack. The fuel cell stacks are disposed in the central area of a power generating reaction chamber to form two columns-by-two rows array in a plan view. A cross-shaped fuel reformer is arranged between the opposing sides of the fuel cell stacks.

11 Claims, 3 Drawing Sheets

U.S. PATENT DOCUMENTS

| | | |
|---|---|---|
| 2005/0164051 A1 | 7/2005 | Venkataraman et al. |
| 2008/0311445 A1 | 12/2008 | Venkataraman et al. |

FOREIGN PATENT DOCUMENTS

| | | |
|---|---|---|
| JP | 62-154578 | 7/1987 |
| JP | 62-283570 | 12/1987 |
| JP | 63-232275 | 9/1988 |
| JP | 3-40379 | 2/1991 |
| JP | 3-216966 | 9/1991 |
| JP | 7-272741 | 10/1995 |
| JP | 8-213041 | 8/1996 |
| JP | 2005-19034 | 1/2005 |
| WO | 02/27839 | 4/2002 |

OTHER PUBLICATIONS

International Search Report issued Feb. 27, 2007 in the International (PCT) Application No. PCT/JP2006/324177.

* cited by examiner

FUEL CELL WITH CROSS-SHAPED REFORMER

BACKGROUND OF THE INVENTION (1) Field of the Invention

The present invention relates to a fuel cell including a plurality of fuel cell stacks, and in particular, a highly efficient fuel cell that effectively utilizes the exhaust heat from each fuel cell stack.

(2) Description of Related Art

In recent years, fuel cells in which the chemical energy contained in fuel is directly converted into electrical energy have been attracting attention as highly efficient and clean power generating apparatuses; in particular, solid oxide fuel cells are high in power generation efficiency and are being studied and developed as third generation fuel cells for use in power generation.

Such a solid oxide fuel cell has a laminated structure in which an air electrode layer and a fuel electrode layer sandwich therebetween a solid electrolyte layer formed of an oxide ion conductor, and at the time of power generation, an oxidant gas (oxygen) is supplied as a reaction gas to the air electrode layer and a fuel gas (for example, $H_2$ and CO) is supplied as another reaction gas to the fuel electrode layer.

In a power generating cell, oxygen (for example, air) supplied to the air electrode layer passes through the pores in the air electrode layer to reach the vicinity of the interface with the solid electrolyte layer, and there the oxygen receives electrons from the air electrode layer to be ionized into an oxide ion ($O^{2-}$). This oxide ion migrates to diffuse in the solid electrolyte layer toward the fuel electrode layer to reach the vicinity of the interface with the fuel electrode layer, reacts there with the fuel gas to release electrons to the fuel electrode layer, and at the same time, discharges the reaction products such as $H_2O$ and $CO_2$ to the outside of the power generating cell as exhaust gas. The electrons generated by the electrode reaction can be taken out as electromotive force through an external load on another route.

In particular, the operation temperature of a solid oxide fuel cell is higher as compared to other fuel cells, and thus attempts to improve power generation efficiency by recovering the high temperature exhaust heat at the time of power generation have been made; for example, Patent Document 1 and Patent Document 2 disclose techniques in which exhaust heat is recovered and utilized for the reforming reaction in a fuel reformer or for preheating the reaction gases (fuel gas and air).

In particular, in the case of solid oxide fuel cells, a high temperature operation type operated at a temperature around 1000° C. discharges a large mount of thermal energy to relatively facilitate the recovery of the thermal energy; however, a low temperature operation type operated at a temperature around 700° C. discharges a smaller amount of thermal energy as compared to the above-described high temperature operation type, which makes it difficult to recover the thermal energy.

Accordingly, in the case of a low temperature operation type, in fuel reforming, for example, the reforming reaction becomes insufficient if efficient heat recovery is not carried out, leading to a fear that hydrogen-rich reformed gas is not obtained. When a large amount of methane is contained in the reformed gas due to insufficient reforming, carbon is deposited in the power generating cells, which drastically degrades the cell performance, and thus it interferes efficient power generation.

Patent Document 1: Japanese Patent Laid-Open No. 62-283570

Patent Document 2: Japanese Patent Laid-Open No. 2005-19034

BRIEF SUMMARY OF THE INVENTION

The present invention was achieved in view of such conventional problems as described above. An object of the present invention is to provide a fuel cell having a satisfactory heat recovery rate that can efficiently recover the exhaust heat from the fuel cell stacks.

For the purpose of achieving the above-described object, a fuel cell according to the present invention is a fuel cell in which fuel cell stacks are housed in a power generating reaction chamber, each of the fuel cell stacks is formed by alternately laminating power generating cells and separators, and at the time of operation, reaction gases are supplied to each of the fuel cell stacks to bring about a power generating reaction, wherein: the fuel cell stacks are disposed in the central area of the power generating reaction chamber to form at least two columns-by-two rows array in terms of a plan view, and a cross-shaped fuel reformer is disposed in between the mutually facing sides of the fuel cell stacks.

In the fuel cell, heat exchangers including fuel heat exchangers and air heat exchangers are preferably disposed around the outer periphery of the fuel cell stacks.

In this case, the heat exchangers are preferably located in an opposed relation to wing sections of the cross-shaped fuel reformer, with the fuel cell stacks being disposed between one of the heat exchangers and one of the wing sections.

Additionally, the fuel heat exchangers and the air heat exchangers are preferably disposed alternately in the circumferential direction around the fuel cell stacks in a spaced confronting relations such that: the fuel heat exchangers in rows are in an opposed relation to the air heat exchangers in rows, with the fuel cell stacks being disposed therebetween (between the fuel heat exchangers in rows and the air heat exchangers in rows), and the fuel heat exchangers in columns are in an opposed relation to the air heat exchangers in columns, with the fuel cell stacks being disposed therebetween (between the fuel heat exchangers in columns and the air heat exchangers in columns).

The present invention can be applied to a solid oxide fuel cell having a sealless structure which discharges a residual gas having not been used in a power generating reaction from the peripheral portion of each of the power generating cells.

According to the present invention, by disposing fuel cell stacks to form at least two columns-by-two rows array in terms of a plan view, the thermal conditions of the respective fuel cell stacks in the power generating reaction chamber can be equalized, and hence collective thermal control of the fuel cell stacks comes to be possible. Consequently, the thermal control mechanism can be simplified as compared to a case where the thermal control of the fuel cell stacks is performed respectively.

The fuel reformer is disposed in a central portion of the power generating reaction chamber, the central portion being surrounded by the plurality of fuel cell stacks to become an accumulation area of radiated heat. Consequently, the fuel reformer receives a large amount of high temperature radiated heat from each of the fuel cell stacks facing the reformer, so as to carry out fuel reformation at a sufficient reforming temperature at a high conversion rate. Thus, a hydrogen-rich reformed gas containing a small amount of residual methane can be supplied to the fuel cell stacks to thereby enable highly efficient power generation.

Additionally, according to the present invention, since the heat exchangers are disposed so as to surround the fuel cell stacks and the fuel reformer, the heat exchangers can perform heat recovery without thermally affecting the heat recovery by the fuel reformer, and reduce the unnecessary heat release (heat loss) to the outside. As a result, a fuel cell having a high heat recovery efficiency can be provided.

Additionally, according to the present invention, in the power generating reaction chamber, the fuel heat exchangers and the air heat exchangers are alternately disposed along the direction of the circumference of the fuel cell stacks, and consequently, the heat absorption amounts of the heat exchangers around the periphery of the fuel cell stacks are well balanced to enable the thermal conditions in a plane direction in the power generating reaction chamber to be equalized, and hence the thermal control of the fuel cell stacks is facilitated.

DESCRIPTION OF SYMBOLS

Figure 1:
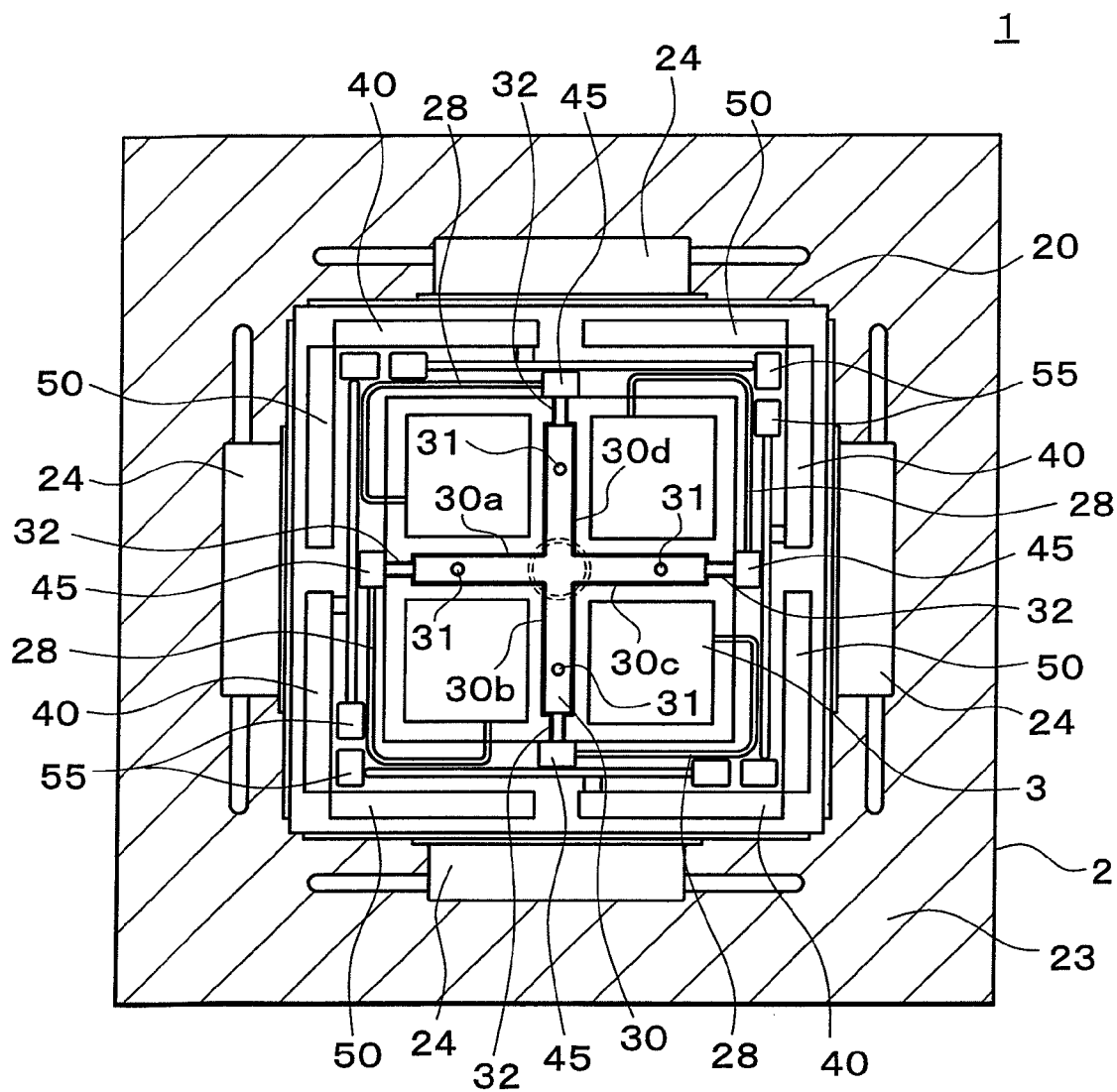
FIG. 1 is a top view illustrating the schematic internal structure of a fuel cell according to the present invention.

1 Fuel cell (solid oxide fuel cell)
3 Fuel cell stack
7 Power generating cell
10 Separator
21 Power generating reaction chamber
30 Fuel reformer
30a, 30b, 30c, 30d Wing sections
40 Fuel heat exchanger
50 Air heat exchanger

DETAILED DESCRIPTION OF THE INVENTION

Hereinafter, an embodiment of the present invention is described with reference to FIGS. 1 to 4.

Figure 2:
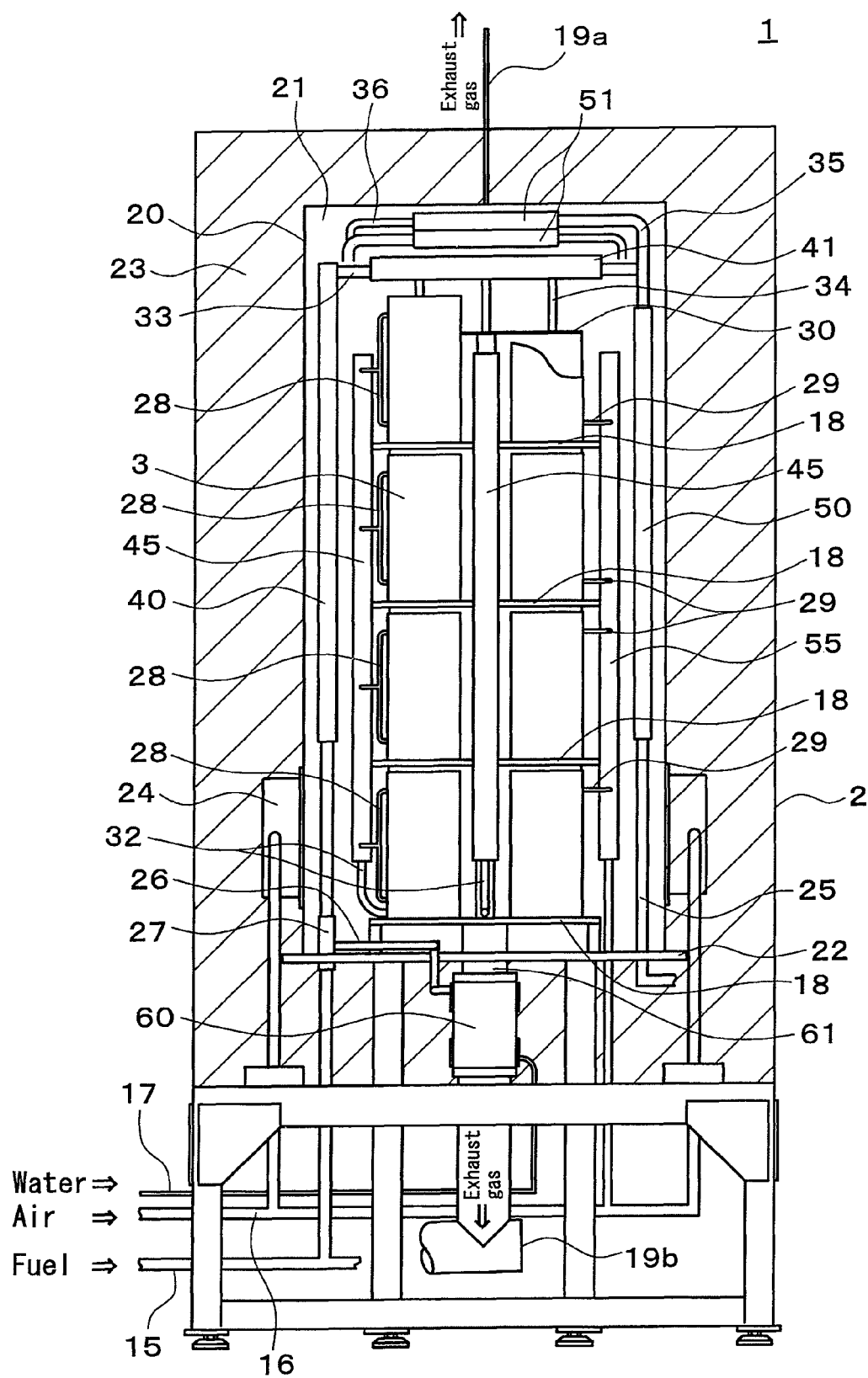
FIG. 2 is a side view illustrating the schematic internal structure of the fuel cell according to the present invention.
Figure 3:
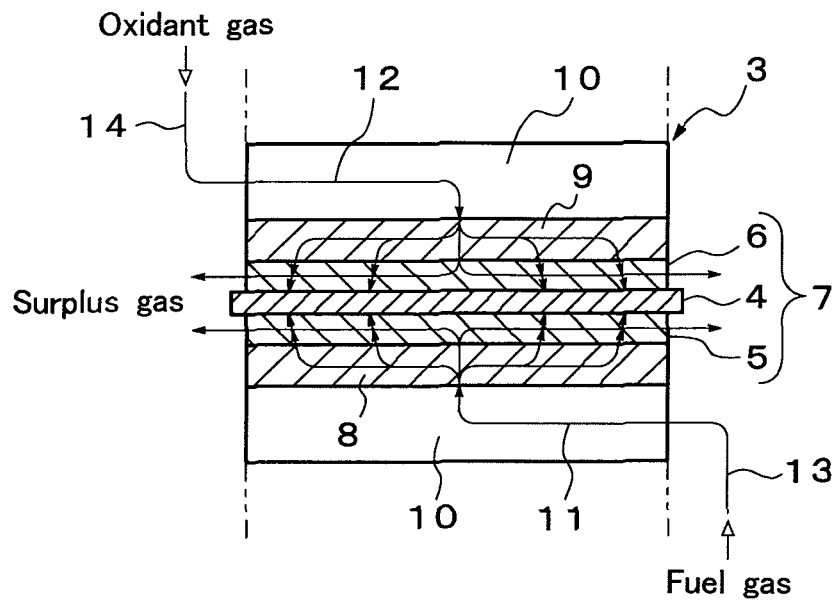
FIG. 3 is a view illustrating the schematic configuration of a main part of a fuel cell stack.
Figure 4:
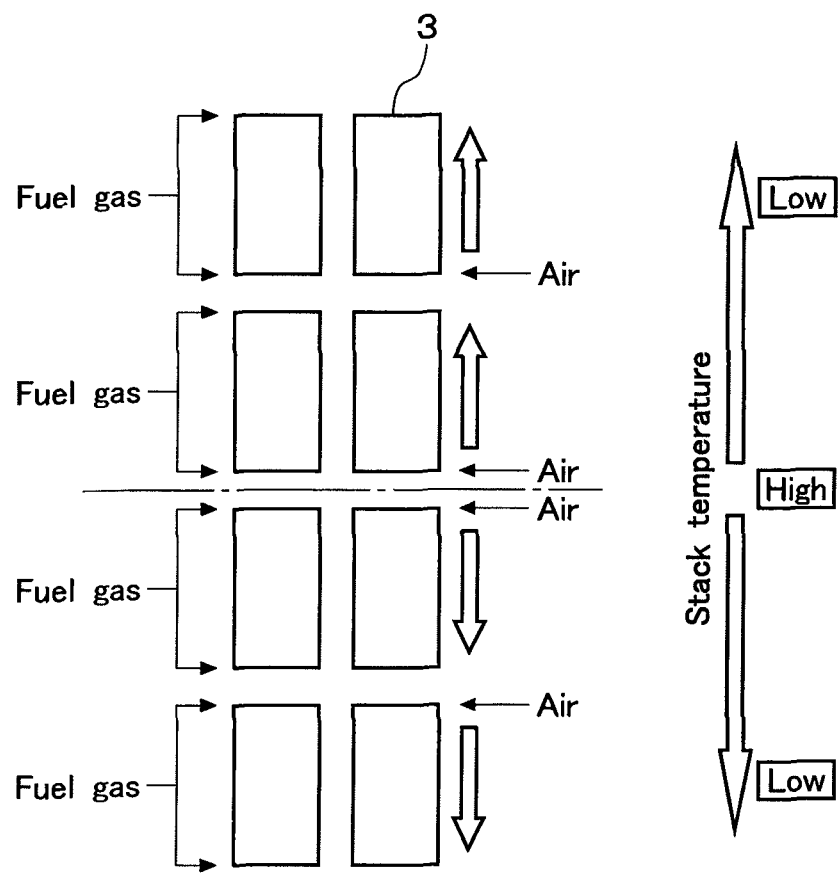
FIG. 4 is a view illustrating the flow of the reaction gas supplied to the fuel cell stacks.

FIG. 1 and FIG. 2 show the schematic internal structure of a solid oxide fuel cell to which the present invention is applied, FIG. 3 shows the schematic configuration of a main part of a fuel cell stack, and FIG. 4 shows the flow of the reaction gas supplied to fuel cell stacks.

In FIG. 1 and FIG. 2, reference numeral 1 denotes a solid oxide fuel cell (fuel cell module), reference numeral 2 denotes a module can, reference numeral 20 denotes an internal can, and a heat insulating material 23 is disposed between the module can 2 and the internal can 20. The internal can 20 maintains the interior of the can (namely, a power generating reaction chamber 21) in an airtight condition. In the central area of the power generating reaction chamber 21, a plurality of fuel cell stacks 3 are disposed so as for the lamination direction to be vertical.

As shown in FIG. 3, each of the fuel cell stacks 3 is obtained by laminating a plurality of unit cells to form a laminate, and by fixing the laminate composed of the unit cells with an electrically insulated member (not shown) to unitize the laminate, wherein a unit cell includes a power generating cell 7 including a fuel electrode layer 5 and an air electrode layer 6 disposed respectively on both sides of a solid electrolyte layer 4, a fuel electrode current collector 8 outside the fuel electrode layer 5, an air electrode current collector 9 outside the air electrode layer 6, and separators 10 outside the current collectors 8 and 9.

Here, the solid electrolyte layer 4 is formed of a stabilized zirconia doped with yttria (YSZ) or the like. The fuel electrode layer 5 is formed of a metal such as Ni or a cermet such as Ni-YSZ, and the air electrode layer 6 is formed of, for example, $LaMnO_3$ or $LaCoO_3$. The fuel electrode current collector 8 is formed of a spongy porous sintered metal plate made of Ni or the like, the air electrode current collector 9 is formed of a spongy porous sintered metal plate made of Ag or the like, and the separator 10 is formed of stainless steel or the like.

The separator 10 has a function of electrically connecting the power generating cells 7, and of supplying the reaction gases to the power generating cells 7, and is provided with a fuel gas passage 11 which introduces the fuel gas, supplied from the fuel gas manifold 13, from the outer surface of the separator 10 and discharges the fuel gas from a central portion of the separator 10 facing the fuel electrode current collector 8 and with an air passage 12 which introduces the air, supplied from an air manifold 14, from the outer surface of the separator 10 and discharges the air from a central portion of the separator 10 facing the air electrode current collector 9.

Additionally, the above-described fuel gas manifold 13 and the above-described air manifold 14 are both formed inside each of the fuel cell stacks 3; inside the stacks, the fuel gas manifold 13 is connected to the fuel distribution pipes 28 of the below-described fuel buffer tanks 45, and the air manifold 14 is connected to the air distribution pipes 29 of the below-described air buffer tanks 55.

Additionally, the fuel cell stack 3 has a sealless structure in which no gas leakage preventing seal is provided in the peripheral portion of the power generating cell 7. At the time of operation, as shown in FIG. 3, the reaction gases (fuel gas and air) discharged toward the power generating cell 7 from the central portion of the separator 10, respectively, through the fuel gas passage 11 and the air passage 12, are supplied to the whole area of the fuel electrode layer 5 and to the whole area of the air electrode layer 6 while the reaction gases (fuel gas and air) are being made to diffuse toward the peripheral portion of the power generating cell 7 so as to allow the power generating reaction to take place; and the residual gas (exhaust gas) remaining unconsumed in the power generating reaction is freely discharged to the outside from the peripheral portion of the power generating cell 7.

In the present embodiment, a high output fuel cell module 1 is formed as follows: the fuel cell stacks 3 having the above-described configuration are arranged in the vicinity of the center of the power generating reaction chamber 21 in a two columns-by-two rows array in terms of a plan view, further four tiers of fuel cell stacks 3 are stacked in the heightwise direction through the intermediary of a mounting base 18, and thus sixteen fuel cell stacks 3 in total are assembled and disposed in an integrated manner.

Additionally, as shown in FIG. 2, exhaust gas pipes 19a and 19b are provided in the top central portion and the bottom central portion of the power generating reaction chamber 21, respectively, for the purpose of discharging to the outside the high-temperature exhaust gas having been discharged into the interior of the power generating reaction chamber 21 from each of the fuel cell stacks 3.

Additionally, in the interior of the power generating reaction chamber 21, a cross-shaped fuel reformer 30 having flat box-shaped wing sections 30a, 30b, 30c and 30d each filled with a reforming catalyst is disposed in between the mutually facing sides of the fuel cell stacks 3 disposed in a two columns-by-two rows array in terms of a plan view in such a way that the fuel reformer 30 extends from the uppermost tier of the fuel cell stacks 3 to the position close to the lowermost tier of the fuel cell stacks 3, and is fixed to the stack mounting base 22 located in the lower portion of the power generating reaction chamber 21 along with the above-described plurality of the fuel cell stacks 3.

As described above, in the present embodiment, the fuel reformer 30 is disposed at a position that allows efficient reception of the radiated heat from the fuel cell stacks 3 and undergoes the highest temperature; a gas inlet 31 for introducing the fuel gas is provided at the upper end of each of wing sections 30a to 30d wherein the upper end of each wing section is located in the upper portion of the power generating reaction chamber 21 and the upper portion undergoes an atmosphere higher in temperature than the lower portion due to the effect of natural convection; and an outlet pipe 32 for discharging the reformed gas is provided at the lower end of each of the wing sections 30a to 30d.

Additionally, in the interior of the power generating reaction chamber 21, around the outer periphery of the fuel cell stacks 3 and the outer periphery of the fuel reformer 30, lateral fuel heat exchangers 40, fuel buffer tanks 45, lateral air heat exchangers 50, air buffer tanks 55 and the like are vertically-arranged along the heightwise direction of the fuel cell stacks 3. A fuel supply pipe 15 extending from the bottom of the module can 2 is connected to the lower end of each of the lateral fuel heat exchangers 40, and a warm air pipe 25 extending from a cooling jacket of a below-described burner 24 is connected to the lower end of each of the lateral air heat exchangers 50.

Additionally, the lateral fuel heat exchangers 40 and the lateral air heat exchangers 50 both have flat-box shapes so as to achieve space saving and to be capable of efficiently receiving the radiated heat from each of the fuel cell stacks 3, and are disposed in the vicinity of the inner wall of the internal can 20 so as to be away from the fuel cell stacks 3 disposed in the central region, wherein fins (not shown) are also disposed on the stack-facing sides of these heat exchangers so as to achieve the improvement of the heat exchange performance.

Specifically, the four lateral fuel heat exchangers 40 and the four lateral air heat exchangers 50 are disposed around the fuel cell stacks 3 so as to respectively face the wing sections 30a to 30d of the fuel reformer 30, and the lateral fuel heat exchangers 40 and the lateral air heat exchangers 50 are arranged alternately along the direction of the circumference of the fuel cell stacks 3 so as to face each other through the two columns of the fuel cell stacks 3 in terms of a plan view or through the two rows of the fuel cell stacks 3 in terms of a plan view.

Between these heat exchangers 40, 50 and the fuel cell stacks 3, the fuel buffer tanks 45 and the air buffer tanks 55 are disposed. The fuel buffer tanks 45 are disposed at the centers of the sides of the two columns-by-two rows array of the fuel cell stacks 3 in terms of a plan view, and the air buffer tanks 55 are disposed at the corners of the two columns-by-two rows array in terms of a plan view.

Additionally, above the fuel cell stacks 3, a top fuel heat exchanger 41 and a top air heat exchanger 51 are disposed both in a horizontal direction. These are flat-plate type heat exchangers with fins.

The top fuel heat exchanger 41 is a heat exchanger located downstream of the above-described lateral fuel heat exchangers 40, the inlets of the top fuel heat exchanger 41 are connected through pipes 33 respectively to the upper ends of the lateral fuel heat exchangers 40, and the outlets of the top fuel heat exchanger 41 are connected through inlet pipes 34 respectively to the gas inlets 31 of the above-described fuel reformer 30. It is to be noted that the outlet pipes 32 of the fuel reformer 30 are connected to the lower ends of the above-described fuel buffer tanks 45.

The top air heat exchanger 51 is a heat exchanger located downstream of the above-described lateral air heat exchangers 50, the inlets of the top air heat exchanger 51 are connected through pipes 35 respectively to the upper ends of the lateral air heat exchangers 50, and the outlets of the top air heat exchanger 51 are connected through pipes 36 respectively to the upper ends of the above-described air buffer tanks 55.

The outlets of the fuel buffer tanks 45 are connected through a plurality of fuel distribution pipes 28 respectively to the fuel cell stacks 3, and the outlets of the air buffer tanks 55 are connected through a plurality of air distribution pipes 29 respectively to the fuel cell stacks 3.

The fuel distribution pipes 28 extending from the fuel buffer tanks 45 are connected respectively to the upper ends and lower ends of the fuel cell stacks 3, and the air distribution pipes 29 extending from the air buffer tanks 55 are connected respectively to the lower ends of the fuel cell stacks 3 in the upper two tiers and to the upper ends of the fuel cell stacks 3 in the lower two tiers.

Additionally, four startup preheating burners 24 (for example, infrared burners) respectively facing the fuel cell stacks 3 are disposed on the lower sides of the internal can 20 in such a way that the respective fuel cell stacks 3 can receive the radiated heat from the preheating burners 24.

These preheating burners 24 are disposed for the purpose of improving the temperature increase rate of the lower fuel cell stacks 3 so as to shorten the startup time. In order to enable the stacks to directly and efficiently receive the radiated heat from the preheating burners 24, the lateral fuel heat exchangers 40 and the lateral air heat exchangers 50 are formed to have lengths so that the lower ends thereof are located above the preheating burners 24, whereby the heat exchangers 40 and 50 are located so as not to face the front faces of the burners.

In the present embodiment, cooling jackets (not shown) are disposed on the lateral and back sides of each of the burners 24, and external air is introduced into the interiors of the jackets through an air supply pipe 16 to cool the burner bodies, and consequently, the burner bodies are prevented from being heated to excessively high temperatures. The cooling air (warmed air) from the cooling jackets is introduced into the above-described lateral air heat exchangers 50 through warm air pipes 25.

On the other hand, a steam generator 60 is disposed beneath the internal can 20.

The steam generator 60 is a heat exchanger to produce high temperature steam for use in fuel reforming. Since the generation of steam requires a large amount of heat rather than a high temperature, the steam generator 60 is located away from the power generating reaction chamber 21 and disposed in a lower exhaust gas pipe 19b which is located outside of the heat exchangers 40 and 50 to be a low temperature portion.

It is to be noted that, in the present embodiment, for the purpose of enabling efficient utilization, as a heat source, of the exhaust gas discharged to the outside from the interior of the power generating reaction chamber 21, the diameter of the lower exhaust gas pipe 19b is made larger than the diameter of the upper exhaust gas pipe 19a such that a large amount of exhaust gas is discharged from the lower exhaust gas pipe 19b.

A water supply pipe 17 is connected to the steam generator 60, the externally supplied water from the water supply pipe 17 changes into steam by undergoing heat exchange, in the water flow path in the steam generator 60, with the high temperature exhaust gas discharged from the power generating reaction chamber 21. The steam outlet is connected, in the interior of the power generating reaction chamber 21, to a fuel mixing unit 27 of the fuel supply pipe 15 through the intermediary of a steam pipe 26.

Additionally, a large number of ceramic beads are filled in the water flow path of the steam generator 60. By filling the ceramic beads, the hunting of steam is prevented such that a stable amount of steam can be supplied to the interior of the power generating reaction chamber 21; additionally, by using high-thermal-conductivity beads such as alumina beads, the heat exchangeability of the steam generator 60 can be improved.

Additionally, a honeycomb combustion catalyst is disposed in the lower exhaust gas pipe 19b, in particular, in the exhaust gas inlet portion 61 of the steam generator 60. In the present embodiment, the unburned methane in the exhaust gas is combusted with the aid of the combustion catalyst, and the combusted gas is used as a heat source for the steam generator 60. In addition to the honeycomb catalyst, a combustion catalyst coating material may also be applied as the combustion catalyst.

In the fuel cell 1 having the above-described configuration, at the time of operation, an external fuel gas (for example, town gas) is introduced into the power generating reaction chamber 21 through the fuel supply pipe 15, and in the power generating reaction chamber 21, the external fuel gas and the high temperature steam from the steam generator 60 flow into each other in the fuel mixing unit 27 to form a mixed gas; the mixed gas is introduced into each of the lateral fuel heat exchangers 40 disposed around the periphery of the fuel cell stacks 3, from the lower portion of each of the fuel heat exchangers 40.

In the course of flowing upward in the interior of the lateral fuel heat exchangers 40, the mixed gas receives the radiated heat from the fuel cell stacks 3 facing the lateral fuel heat exchangers 40 so as to be increased in temperature, and is guided to the upper portions, above the stacks, having a higher atmospheric temperature; the mixed gas is further increased in temperature in the top fuel heat exchanger 41 so as to become a high temperature mixed gas.

In the upper end of the fuel reformer 30, the high temperature mixed gas is introduced into the interior of the reformer from the gas inlets 31 in the ends of the respective wing sections 30a to 30d. By providing the gas inlets 31 in the end portions of the respective wing sections 30a to 30d wherein the end portions obtain radiated heat in a larger amount than in the central portions, the radiated heat from each of the fuel cell stacks 3 can be received efficiently.

In the course of flowing downward in the interior of each of the wing sections 30a to 30d, the introduced gas undergoes a reforming reaction due to the reforming catalyst. The reforming reaction is an endothermic reaction, and the heat required for the reforming reaction is obtained by recovering the radiated heat from the fuel cell stacks 3. The absorbed heat amount due to the reforming reaction is larger in the upper portion of the reformer higher in temperature, and is decreased toward the lower portion of the reformer; thus, such a change of the absorbed heat amount enables the thermal balance in the heightwise direction of the fuel cell stacks 3 to be made uniform.

The hydrogen-rich fuel gas reformed in the fuel reformer 30 is discharged from each of the outlet pipes 32 in the downstream portion (lower portion), introduced into and stored in the fuel buffer tanks 45 through pipes, and thereafter distributed to each of the fuel cell stacks 3 (specifically, the fuel gas manifold 13).

In this case, as illustrated in FIG. 4, the fuel gas in the fuel buffer tanks 45 is supplied to the upper end portion and the lower end portion of each of the fuel cell stacks 3. In this way, by supplying the fuel gas to the top and bottom (both ends) of each of the stacks, the pressure drop difference in the course of the gas flow is alleviated, and the fuel gas can be stably supplied to each of the power generating cells 7 in a manner evenly distributed over all the power generating cells 7. Accordingly, the power generation performances of the respective power generating cells are made uniform, and thus, the power generation efficiency can be improved.

On the other hand, external air (cooling air) is supplied to the cooling jackets of the burners 24 through the air supply pipe 16, to cool the burner bodies, and then the cooling air passing through the cooling jackets is supplied through warm air pipes 25 to each of the lateral air heat exchangers 50 disposed around the periphery of the fuel cell stacks 3, from the lower portion of each of the lateral air heat exchangers 50.

In the course of flowing upward in the interior of each of the lateral air heat exchangers 50, the cooling air efficiently receives the radiated heat from each of the fuel cell stacks 3 facing the lateral air heat exchangers 50 to be increased in temperature, the cooling air is further increased in temperature in the top air heat exchangers 51 above the stacks, and thereafter the cooling air is introduced through pipes into and stored in the air buffer tanks 55, and is distributed to each of the fuel cell stacks 3 (specifically to the air manifold 14).

In this case, as shown in FIG. 4, the air in the air buffer tanks 55 is supplied from the central portion, high in temperature, of the fuel cell module 1 (from the lower ends of the stacks in the upper two tiers and from the upper ends of the stacks in the lower two tiers), the air increased in temperature in the course of flowing upward and downward from the supplied positions increases the temperatures of the both ends of the stacks relatively low in temperature. In this way, the temperatures of the stacks are made uniform in the heightwise direction of the stacks.

Additionally, the warmed air from the top air heat exchanger 51 is introduced into each of the air buffer tanks 55 from the upper end thereof, and the external air from the air supply pipe 16 is introduced into each of the air buffer tanks 55 from the lower end of each of the air buffer tanks 55; accordingly, the stack temperature can also be controlled on the basis of the supply ratio between the preheated air and the external air.

The flow of the reaction gases (fuel gas and air) supplied to each of the fuel cell stacks 3 is as illustrated in FIG. 3.

As described above, in the present invention, the fuel cell stacks 3 are disposed to form at least two columns-by-two rows array in terms of a plan view; consequently, the thermal conditions of the respective fuel cell stacks 3 can be equalized in the interior of the power generating reaction chamber 21, collective thermal control of these fuel cell stacks 3 comes to be possible, and hence thermal control mechanism (supply controllers and distribution channels of fuel gas and air) can be simplified as compared to a case where each of the fuel cell stacks 3 is thermally-controlled, respectively.

Additionally, the fuel reformer 30 is disposed in a central portion of the power generating reaction chamber 21, the central portion being surrounded by the plurality of fuel cell stacks 3 to become an accumulation area of radiated heat and being highest in temperature; consequently, the fuel reformer 30 receives a large amount of high temperature heat radiated from each of the stacks 3 facing the fuel reformer 30, so as to carry out fuel reforming at a sufficient reforming temperature at a high conversion rate. Thus, a hydrogen-rich reformed gas containing a small amount of the residual methane can be supplied to the fuel cell stacks 3 to thereby enable highly efficient power generation.

Additionally, the heat exchangers 40 and 50 are disposed along the inner wall of the internal can 20 so as to surround the fuel cell stacks 3 and the fuel reformer 30; consequently, the heat exchangers can perform heat recovery without thermally affecting the heat recovery by the fuel reformer 30, and reduce the unnecessary heat release (heat loss) to the outside of the module. As a result, a fuel cell module 1 having a high heat recovery efficiency can be actualized.

Additionally, the lateral fuel heat exchangers 40 and the lateral air heat exchangers 50 are alternately disposed along the direction of the circumference of the fuel cell stacks 3; consequently, the heat absorption amounts of the heat exchangers around the periphery of each of the fuel cell stacks 3 are well balanced to enable the thermal conditions in a plane direction in the power generating reaction chamber 21 to be equalized, hence the thermal control of the fuel cell stacks 3 is facilitated, and accordingly, the thermal control mechanism can be simplified.

In particular, in a solid oxide fuel cell 1 having a sealless structure, the high temperature exhaust gas is freely discharged from the peripheral portions of the fuel cell stacks 3 into the interior of the power generating reaction chamber 21; this is extremely favorable for the above-described heat recovery by the fuel reformer 30 and the respective heat exchangers 40, 41, 50 and 51. Additionally, in the present embodiment, the airtight structure of the power generating reaction chamber 21 provided by the internal can 20 prevents the useless release of the high temperature exhaust gas in the power generating reaction chamber 21 to the outside of the module from the chinks in the surrounding heat insulating material 23, and hence the interior of the power generating reaction chamber 21 can be maintained in a high temperature atmospheric condition.

Owing to the above-described operation, a highly efficient fuel cell module 1 that effectively utilizes the heat released from the fuel cell stacks 3 can be provided.

As described above, in the present embodiment, the fuel reformer 30 is made to be a cross shape capable of fitting in between the mutually facing sides of the fuel cell stacks 3. However, a configuration in which a flat box-shaped fuel reformer is disposed in between each of the pairs of mutually facing sides of the fuel cell stacks 3 may also be adopted.

Additionally, as for the fuel cell module 1, description has been made on the configuration in which four fuel cell stacks 3 are disposed in a plane direction, and each of which is vertically stacked in four tiers in the heightwise direction; however, needless to say, the number of tiers is not limited to the above-mentioned value. What matters is that the structure of the fuel cell module 1 is only required to be a structure in which the fuel reformer 30 is disposed in the central portion of the power generating reaction chamber 21, the central portion being surrounded by the fuel cell stacks 3 to be an accumulation area of the radiated heat from the stacks 3.

INDUSTRIAL APPLICABILITY

According to the present invention, a fuel cell that can efficiently recover the exhaust heat from the fuel cell stacks and is excellent in heat recovery efficiency can be provided.

The invention claimed is:

1. A fuel cell comprising:
a cross-shaped fuel reformer;
fuel cell stacks housed in a power generating reaction chamber, each of the fuel cell stacks being formed by alternately laminating power generating cells and separators, and the fuel cells being operable to generate power when supplied with reaction gases; and
heat exchangers disposed around the fuel cell stacks and outwardly of the fuel stacks with respect to a center of the power generating reaction chamber, the heat exchangers including fuel heat exchangers and air heat exchangers,
wherein the fuel cell stacks are disposed in the power generating reaction chamber to form an array having at least two columns and two rows,
wherein the cross-shaped fuel reformer is disposed in between the mutually facing sides of the fuel cell stacks, and
wherein the cross-shaped fuel reformer has wing sections extending at right angles to form a cross-shape, and the heat exchangers are located in an opposed relation to the wing sections of the fuel reformer, with the fuel cell stacks being disposed between opposing heat exchangers and wing sections.

2. The fuel cell according to claim 1, wherein the fuel cell is a solid oxide fuel cell having a sealless structure which discharges a residual gas having not been used in a power generating reaction from the peripheral portion of each of the power generating cells.

3. The fuel cell according to claim 2, wherein the fuel heat exchangers and the air heat exchangers are alternately disposed around the fuel cell stacks in a spaced configuration such that the fuel heat exchangers in rows are in an opposed relation to the air heat exchangers in rows, with the fuel cell stacks being disposed therebetween, and the fuel heat exchangers in columns are in an opposed relation to the air heat exchangers in columns, with the fuel cell stacks being disposed therebetween.

4. The fuel cell according to claim 3, wherein each fuel cell stack is disposed between one of the wing sections and one of the fuel heat exchangers and also between another one of the wing sections and one of the air heat exchangers.

5. The fuel cell according to claim 1, wherein the fuel heat exchangers and the air heat exchangers are alternately disposed around the fuel cell stacks in a spaced configuration such that the fuel heat exchangers in rows are in an opposed relation to the air heat exchangers in rows, with the fuel cell stacks being disposed therebetween, and the fuel heat exchangers in columns are in an opposed relation to the air heat exchangers in columns, with the fuel cell stacks being disposed therebetween.

6. The fuel cell according to claim 5, wherein each fuel cell stack is disposed between one of the wing sections and one of the fuel heat exchangers and also between another one of the wing sections and one of the air heat exchangers.

7. The fuel cell according to claim 1, wherein each fuel cell stack is disposed between one of the wing sections and one of the fuel heat exchangers and also between another one of the wing sections and one of the air heat exchangers.

8. A fuel cell comprising:
a cross-shaped fuel reformer;
fuel cell stacks housed in a power generating reaction chamber, each of the fuel cell stacks being formed by alternately laminating power generating cells and separators, and the fuel cells being operable to generate power when supplied with reaction gases; and heat exchangers disposed around the fuel cell stacks and outwardly of the fuel stacks with respect to a center of the power generating reaction chamber, the heat exchangers including fuel heat exchangers and air heat exchangers, wherein the fuel cell stacks are disposed in the power generating reaction chamber to form an array having at least two columns and two rows, wherein the cross-shaped fuel reformer is disposed in between the mutually facing sides of the fuel cell stacks, and wherein the fuel heat exchangers and the air heat exchangers are alternately disposed around the fuel cell stacks in a spaced configuration such that the fuel heat exchangers in rows are in an opposed relation to the air heat exchangers in rows, with the fuel cell stacks being disposed therebetween, and the fuel heat exchangers in columns are in an opposed relation to the air heat exchangers in columns, with the fuel cell stacks being disposed therebetween.

9. The fuel cell according to claim 8, wherein the fuel cell is a solid oxide fuel cell having a sealless structure which discharges a residual gas having not been used in a power generating reaction from the peripheral portion of each of the power generating cells.

10. The fuel cell according to claim 9, wherein each fuel cell stack is disposed between one of the wing sections and one of the fuel heat exchangers and also between another one of the wing sections and one of the air heat exchangers.

11. The fuel cell according to claim 8, wherein each fuel cell stack is disposed between one of the wing sections and one of the fuel heat exchangers and also between another one of the wing sections and one of the air heat exchangers.

* * * * *